(No Model.)

2 Sheets—Sheet 1.

H. J. BREWER.
ELECTRIC BATTERY CONNECTION.

No. 441,130. Patented Nov. 25, 1890.

Witnesses:
D. W. Gardner
C. R. Ferguson

Inventor:
Horatio J. Brewer.
By his attorneys
Dickerson Brown Foster & Freeman (No Model.) 2 Sheets—Sheet 2.
H. J. BREWER.
ELECTRIC BATTERY CONNECTION.
No. 441,130. Patented Nov. 25, 1890.
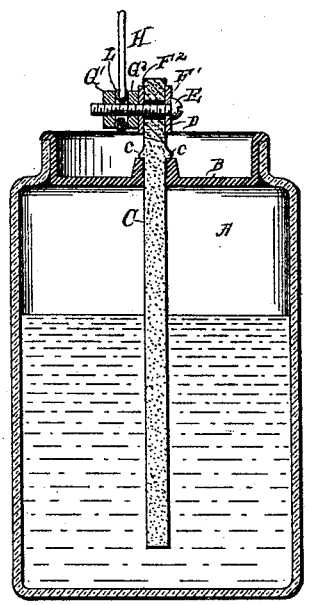
Fig. 3.
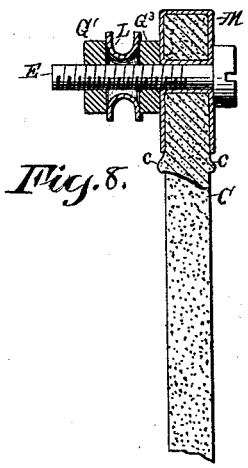
Fig. 8.
Fig. 4. Fig. 5.
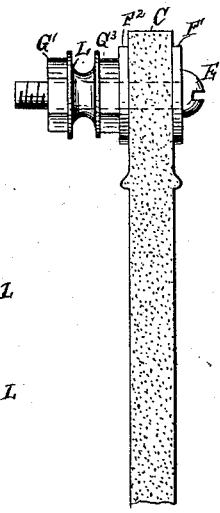 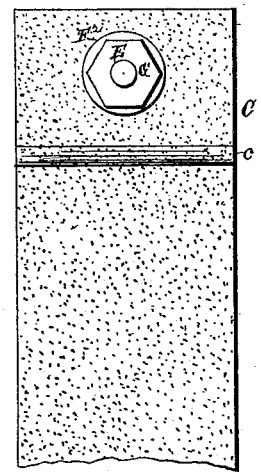

Witnesses: Inventor:
Horatio J. Brewer,
By his attorneys

UNITED STATES PATENT OFFICE.

HORATIO J. BREWER, OF NEW YORK, N. Y.

ELECTRIC BATTERY CONNECTION.

SPECIFICATION forming part of Letters Patent No. 441,130, dated November 25, 1890.

Application filed September 5, 1890. Serial No. 364,020. (No model.)

*To all whom it may concern:*

Be it known that I, HORATIO J. BREWER, of the city, county, and State of New York, have invented a new and useful Improvement in Electric Battery Connections, of which the following is a full, true, and exact description, reference being had to the accompanying drawings.

My improvement relates particularly to batteries in which carbon elements are employed, and the principal object of my improvement is to provide a connection for such elements which will not be liable to corrode to any material extent.

I will describe my battery-connections embodying the improvement, and then point out the novel features in the claims.

Figure 1:
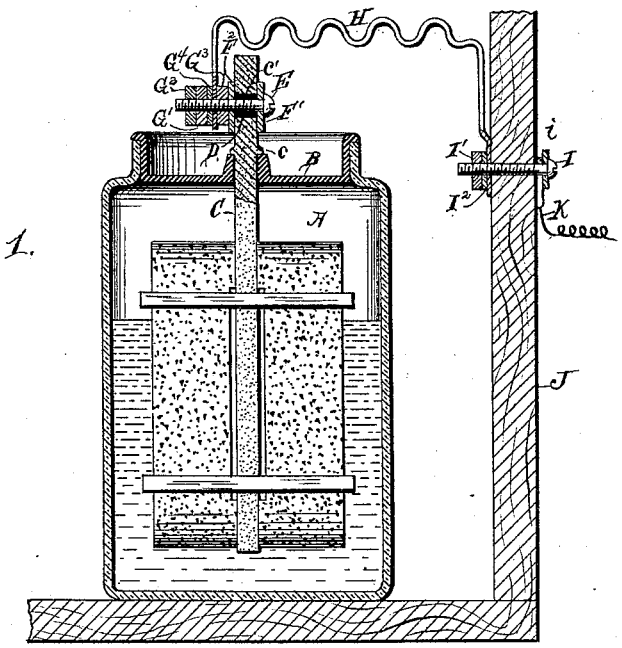
Figure 2:
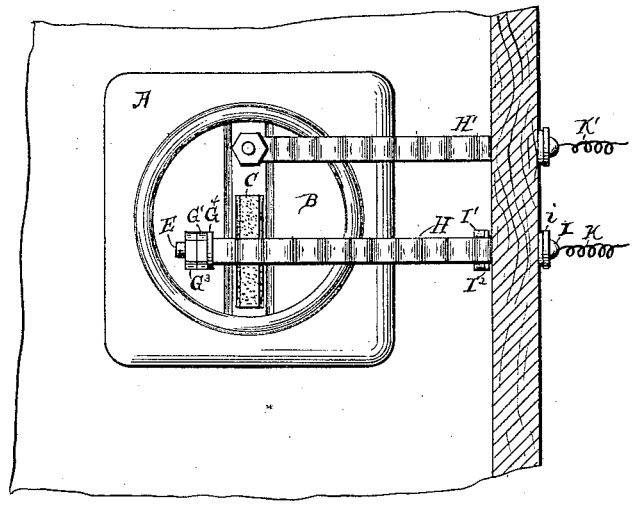
Figure 6:
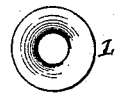
Figure 7:

In the accompanying drawings, Figure 1 is a vertical section of the battery and telephone-box, forming a support for the battery and connections between the telephone-box and the battery. Fig. 2 is a plan of the battery and connections and a horizontal section through a portion of the telephone-box. Fig. 3 is a vertical section of a battery and connections, illustrating a modification. Fig. 4 is a side view of the carbon element of the battery illustrated in Fig. 3 and connections combined therewith. Fig. 5 is a face view of the parts illustrated in Fig. 4. Fig. 6 is a face view of an eyelet forming part of the connections. Fig. 7 is a transverse section of this eyelet, and Fig. 8 is a vertical section of part of a carbon element and connections combined therewith.

Similar letters of reference designate corresponding parts in all the figures.

Referring first to Figs. 1 and 2, A designates a battery-cell, which may be of any desirable form and material. It is shown as closed at the upper end by a cover B.

C designates a carbon element which is comprised in the battery. It is shown as supported in the cover B by means of ribs $c$, which project laterally from it over a portion of the cover B, adjacent to the opening through which said carbon element passes into the cell.

In the upper part of the carbon element C a horizontal hole $c'$ is formed. In this hole is fitted a rubber sleeve or gasket D. Through this sleeve or gasket passes a connection, preferably made in the form of a screw E, and made of zinc. Against each side of that portion of the carbon element in which the hole $c'$ is formed washers $F'$ $F^2$ are arranged, and these washers will preferably be made of tin. The connection or screw E passes through both washers, and beyond the washers has applied to it means whereby a conductor H may be fastened to the screw. The advantage of making the connection E in the form of a screw is that when so made it may receive a nut $G'$ for the purpose of clamping the conductor H. I have shown a nut $G^2$ also applied to the screw, and it is preferred to use the second nut as a check or jam nut. Preferably there will be a nut or washer $G^3$ intermediate of the washer $F^2$ and the conductor H, and it also will be advantageous to arrange a washer $G^4$ between the conductor H and the nut.

The conductor H is shown as made in the form of a strip, and when so made it will have a hole formed near one end to enable it to be slipped over the connection or screw E. The other end will also have a similar hole to enable it to fit upon a connection I, whereby it will be fastened to a telephone-box or like device J. The connection I is shown as made in the form of a screw extending through one of the walls of the box and through the conductor H, and having a nut $I'$ applied to its end portion. A washer $I^2$ may advantageously be arranged between the nut and the conductor H. By means of this screw, the conductor may be clamped to one side of the telephone-box. Intermediate of the head of the screw I and the telephone-box is a washer $i$, and between this washer and the side of the telephone-box a wire K extends. This wire leads to the telephone. Of course the screw I, the washer $I^2$, the nut $I'$, and the washer $i$ will be made of metal. Preferably all of these parts, except the washer $i$, will be made of zinc, and the washer $i$ will be made of tin, or tin will, in some other manner, be interposed between the telephone-wire and the nearest part of zinc. The connection of the other battery element with the telephone may be made in any suitable manner. As is shown, the connection consists of a strip $H'$, which is fastened to the telephone-box and electrically connected with a telephone-wire $K'$ in the same manner as the strip H.

The advantages of the connection which I have described for the carbon element are numerous. The electrical communication between the carbon and the connection being made through tin, the liability of galvanic action between the carbon and the metal contacting with it is practically obviated. The isolation of the zinc from the carbon prevents it from producing any galvanic action in connection with the carbon. The employment of zinc for the connection is advantageous, in that it will not appreciably corrode and will be strong, and is of such character that a screw-thread may be formed upon it so as to enable it to be made in the form of a screw and combined with nuts. The conductor H can advantageously be made of tin because of the pliability and non-corrosive quality of this metal.

It will be seen that in the application of my improvement to a telephone-box the telephone-wires are terminated by the box, and a non-corrosive connection extends between the box and the battery.

In the example of my improvement illustrated in Figs. 3 to 7, inclusive, the connection E is the same as in the example of the improvement already described, and is similarly combined with washers F' F², these washers preferably being made of tin. Here I have shown a nut G³ applied to the screw-connection E just outside the washer F², and an eyelet L applied to the screw-connection outside of the nut G³. Beyond the eyelet a nut G' is applied to the screw-connection. If desirable, a check-nut may be applied to the screw-connection outside of the nut G'.

The eyelet L will preferably be made of tin, and a connection H of any desirable form will have its end portion passed around the exterior groove of the eyelet. The nut G' will then be manipulated so as to clamp the conductor H within the eyelet. In this manner a good electrical communication will be established between the eyelet and the conductor, and one which will prevent electrical contact and galvanic action between the copper wire and the zinc parts employed.

Fig. 8 illustrates a connection similar to that illustrated by Figs. 3 to 7, inclusive, except that the washers F' F² and the rubber collar or gasket D are omitted, and in lieu thereof the entire end portion of the carbon to which the connection E is applied has an envelope M, made, preferably, of tin. This envelope may advantageously be plated upon the carbon, and will of course extend within the hole of the carbon through which the screw-connection passes, and cover the side portions of the carbon over which the nut G³ and the head of the screw-connection E extend.

The advantages heretofore ascribed to the example of my improvement illustrated by Figs. 1 and 2 are also obtained by the examples of the improvement illustrated by Figs. 3 to 8, inclusive.

Having thus described my invention, what I claim, and desire to secure by Letters Patent, is—

1. In an electric battery, the combination, with a carbon element, of a zinc connection therefor, the said connection being separated from the element, substantially as specified.

2. In an electric battery, the combination, with a carbon element, of a zinc connection and a metal arranged intermediate of the zinc connection and the carbon element, and of such character that it will not produce any appreciable galvanic action in connection with the carbon element, substantially as specified.

3. In an electric battery, the combination, with a carbon element, of a zinc connection and a facing of tin intermediate of the zinc connection and the carbon element, substantially as specified.

4. In an electric battery, the combination, with a carbon element, of a zinc connection and tin facings applied to the sides of the carbon element, substantially as specified.

5. In an electric battery, the combination, with a carbon element, of a zinc screw, a nut applied to said screw, and facings of tin arranged intermediate of the screw and the carbon element and establishing electrical communication between the zinc screw and the carbon element, substantially as specified.

6. In an electric battery, the combination, with a carbon element, of a zinc screw, an eyelet applied to the screw and constructed to receive an electrical conductor, and a nut also applied to the screw, substantially as specified.

7. The combination, with a zinc electrical connection, of a copper conductor leading thereto, and an interposed piece of tin, substantially as specified.

8. The combination, with a piece of insulating material, of a zinc electrical connection passing through the same, a nut applied to the said zinc connection on one side of the insulating material, a copper conductor in electrical communication with the zinc connection on the other side of the insulating material, and a piece of tin interposed between the copper conductor and the zinc connection, substantially as specified.

9. The combination, with the connection of a battery element, of a copper conductor and an electric conductor of tin between the copper conductor and the element, substantially as described.

In testimony whereof I have signed my name to this specification in the presence of two subscribing witnesses.

HORATIO J. BREWER.

Witnesses:
EDWIN H. BROWN,
ANTHONY GREF.